United States Patent [19]

Gnida et al.

[11] 4,215,187
[45] Jul. 29, 1980

[54] GAS-TIGHT GALVANIC CELL

[75] Inventors: Bernd Gnida, Hofheim; Gerhard Simon, Kelkheim; Eckart Buder, Kriftel; Hans-Jürgen Schwartz, Hemer, all of Fed. Rep. of Germany

[73] Assignee: Varta Batterie Aktiengesellschaft, Hanover, Fed. Rep. of Germany

[21] Appl. No.: 930,358

[22] Filed: Aug. 2, 1978

[30] Foreign Application Priority Data

Sep. 23, 1977 [DE] Fed. Rep. of Germany ....... 2742869
Dec. 17, 1977 [DE] Fed. Rep. of Germany ....... 7738507

[51] Int. Cl.² .................................................. H01M 2/26
[52] U.S. Cl. .................................. 429/161; 429/181; 429/185; 429/206
[58] Field of Search ............... 429/206, 161, 178, 162, 429/180, 181, 184, 185

[56] References Cited

U.S. PATENT DOCUMENTS

| 701,253 | 5/1902 | Bennett | 429/180 X |
|---|---|---|---|
| 2,981,782 | 4/1961 | Warren et al. | 429/206 X |
| 3,094,438 | 6/1963 | Daley et al. | 429/178 X |
| 3,113,892 | 12/1963 | Albrecht | 429/184 X |
| 3,114,085 | 12/1963 | Ruscetta et al. | 429/181 X |
| 3,579,387 | 5/1971 | Voyentizie et al. | 429/206 X |
| 3,928,077 | 12/1975 | Sperandio et al. | 429/162 |
| 4,098,962 | 7/1978 | Dennison | 429/206 X |

Primary Examiner—Charles F. LeFevour
Attorney, Agent, or Firm—Weiser, Stapler & Spivak

[57] ABSTRACT

The electrodes and separators are assembled into a plate package, which is slipped over a post extending upward from the cell housing bottom. Pole lead-through is provided in the lid, the lead-through includes a rivet and a sealing ring. The edges of the housing bottom and the tip of the post are welded to the lid to close the cell.

6 Claims, 6 Drawing Figures

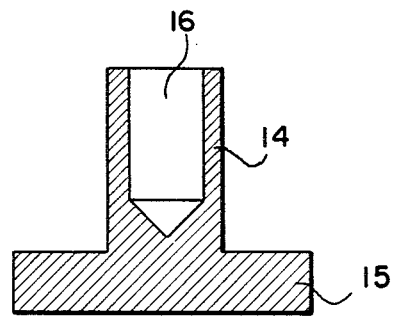
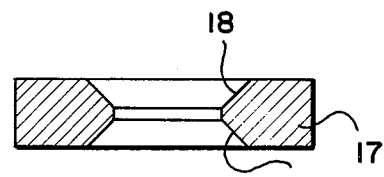
FIG. 2  FIG. 3
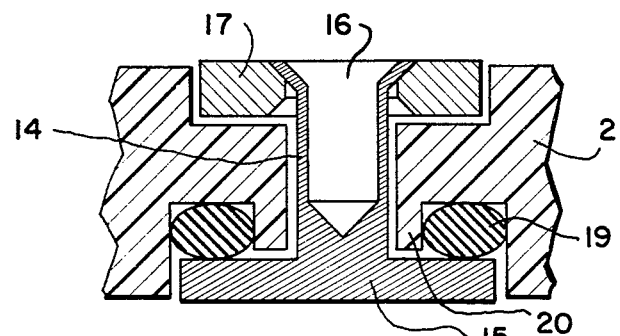
FIG. 4
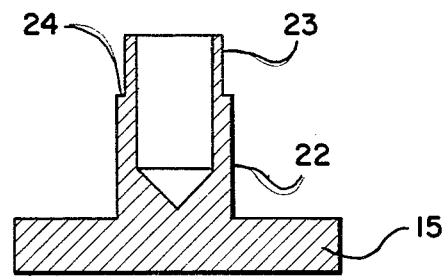
FIG. 5
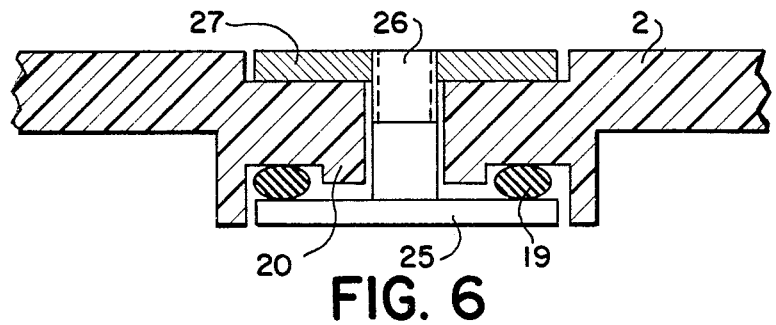
FIG. 6

GAS-TIGHT GALVANIC CELL

The invention relates to a galvanic cell which is closed in gas-tight manner and has a synthetic plastic housing, and more particularly to a alkaline small battery with sinter-foil electrodes.

U.S. Pat. No. 3,928,077 discloses a gas-tight flat cell which contains two interconnected negative electrodes which surround a positive electrode covered by separators. The housing consists of a box-shaped metal bottom connected to the negative electrodes. The top of the housing is closed by a plastic lid which contains a rivet-shaped pole lead-through for the positive electrode and a vent opening serving as an over-pressure safety. In addition, in this publication there is described a galvanic flat cell with an all-metal housing. Here, too, the negative electrodes are electrically connected with the metal housing, whereas the positive electrode is led to the outside through a special insulating seal.

Gas-tight cells with metal housing normally require costly manufacturing methods; a particular problem is presented by the current take-off for that electrode which is not electrically connected to the housing. In addition, difficulties can be expected with hermetic sealing at the junction between the metal housing portion and the portion made of synthetic plastic, or which is to be insulated.

Additional disadvantages can also arise at temperatures below 0° C. at which the different coefficients of expansion of the various materials cause the lead-through to loose its hermetic seal. Moreover, during extended overcharging, a high internal cell gas pressure can arise which can create a bulging of the flat cell housing depending upon the construction of the cell or the materials used and the strength of the housing. Moreover, if the battery is in an inverted position, electrolyte can escape through the vent openings provided for over-pressure relief.

Accordingly, it is an object of the invention to provide a gas-tight galvanic cell with enclosing synthetic plastic housing which is as flat as possible, and whose dimensions remain unaffected by evolution of gas under pressure in the interior of the cell due to possible overcharging or prolonged charging. Moreover, a high production rate coupled with optimum sealing is to be achieved.

These objects and others which will appear are accomplished in accordance with the invention by constructing the electrodes and separators in the form of a plate package which is surrounded by a housing consisting of a bottom portion and a lid. The housing bottom has at least one housing post which extends into corresponding apertures in the plate package. The tip of the housing post is welded to the housing lid and the housing lid contains the two poles lead-through.

In a preferred embodiment, the pole lead-through takes the form of a rivet which has a plate-shaped rivet head. The rivet head rests upon a spacing ring which is firmly attached to the lid, and surrounds the shaft of the rivet, and presses an elastically deformable sealing ring against the inner side of the lid. In its upper portion, the rivet shaft is formed as a hollow cylinder and is riveted over the rim of a metallic ring-shaped disc.

The housing post extends above the edges of the housing bottom and is provided with a tapering tip. To manufacture the battery according to the invention, the positive and negative electrodes as well as the separators between electrodes are joined into a plate package and are attached by means of an adhesive tape which is resistant to the alkaline liquid. Thereafter, the current take-offs of the negative electrodes surrounding the positive electrode are welded together. The plate package is then inserted over the housing post and the current take-offs are welded to the contact discs of the lid. Next, the housing post and the edges of the housing bottom are connected to each other by high frequency or ultra-sonic welding. In so doing, the edges of the housing bottom and the tip of the housing plug serve as energy connectors for the welding process.

For further details, reference is made to the discussion which follows in light of the accompanying drawings wherein FIG. 1 shows the components of the cell before assembly.

FIG. 2 shows a cross-section of a rivet serving as pole bolt.

FIG. 3 shows the ring-shaped disc required for the riveting.

FIG. 4 shows the assembled pole lead-through in cross-section.

FIG. 5 shows a rivet provided with a shoulder.

FIG. 6 shows a pole lead-through with threaded connection.

Figure 1:
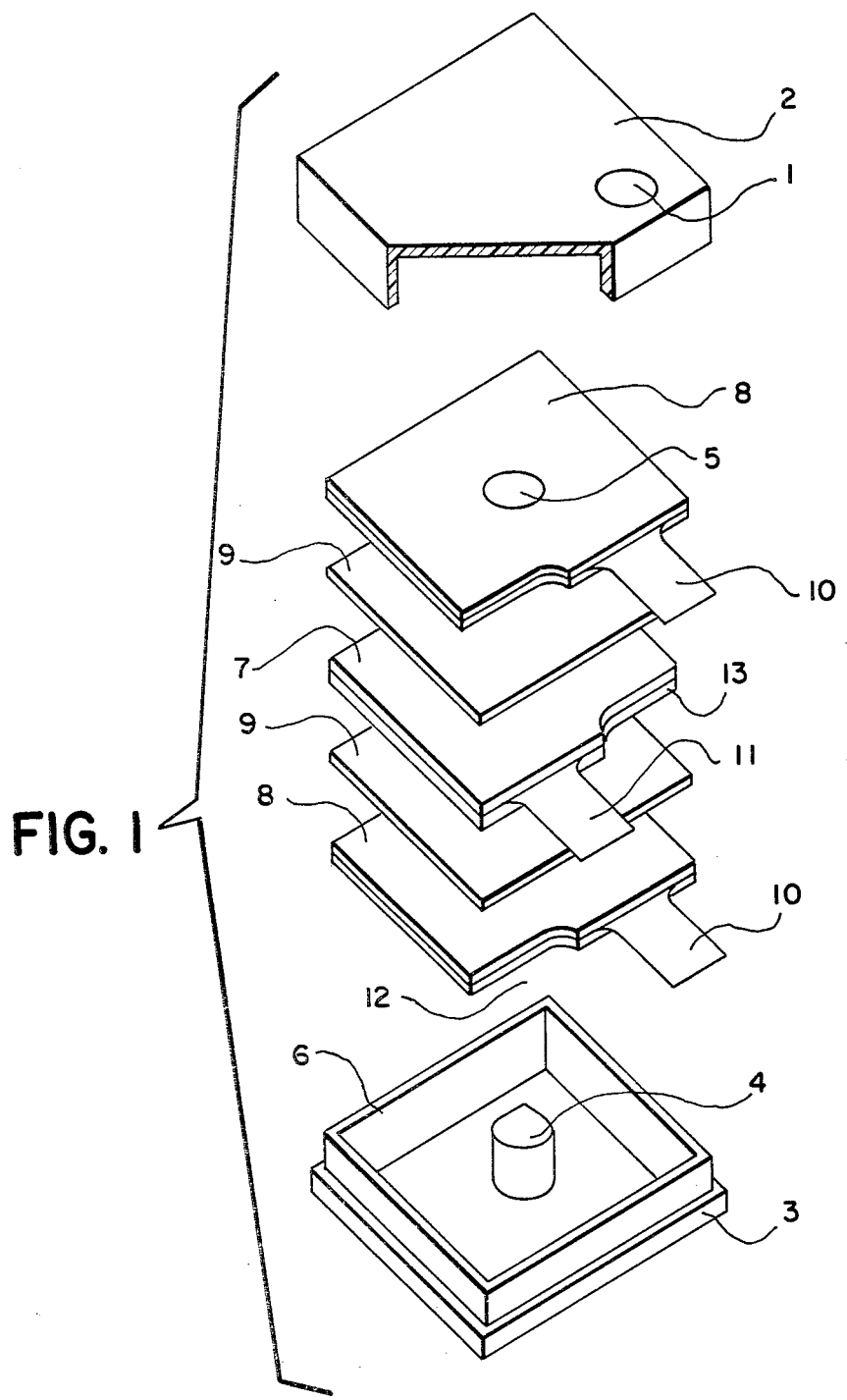

In accordance with FIG. 1, the cell consists of a lid 2 provided with the pole lead-through 1 which together with the bottom portion 3 houses the electrode package. The electrode package consists of a positive electrode 7 which is surrounded by two separators 9 and two negative electrodes 8. The electrodes and separators have in their middle an aperture 5 through which can be inserted the housing post 4 of the bottom portion. The height of the housing post is so proportioned that, when the housing lid 2 is placed over the bottom portion, the post reaches all the way up to the lid. Bottom portion 3 has lateral edges 6 upon which housing lid 2 seats. The lateral edges 6 serve as energy concentrators for the welding of bottom portion and housing lid. The housing post 4 fixes the plate package in its position within the housing and mainly serves to stabilize the cell container during overcharging and prolonged charging of the cell embodying the invention.

The positive electrode 7 has a current take-off foil which is connected to pole lead-through 1 via current take-off 11—insulated from the negative electrodes by recess 12. Similarly, current take-off 10 of the lower negative electrode 8 is insulated from positive electrode 7 by recess 13. The two current take-offs 10 of the negative electrodes are jointly connected to the negative pole lead-through.

To manufacture a battery according to the invention, the positive and negative electrodes 7, 8, together with the separators 9 placed between the electrodes, are united into a plate package which is provided with an adhesive tape resistant to akaline liquid. Thereafter, the negative current take-off 10 of the lower electrode 8 is bent upwardly and connected by welding to the current take-off 10 of the upper electrode. After inserting the plate package over housing post 4 the current take-offs 10 and 11 are welded to the pole lead-throughs 1 of lid 2. In a subsequent welding process, the housing post 4 and the edges 6 of the bottom portion 3 are welded to lid 2. For this purpose, ultra-sonic or high frequency welding methods are particularly suitable. In this manner, the housing is closed in gas-tight and electrolyte-tight manner.

FIG. 2 shows a cross-section of the rivet whose shaft 14 is provided at its bottom end with a plate-shaped rivet head 15. The upwardly open shaft 14 has a hollow 16 in the shape of a cylinder ending in a cone.

FIG. 3 shows a cross-section of the ring-shaped disc 17 required for the riveting. To facilitate the assembly, both sides of the opening in the ring-shaped disc are provided with a conical widening 18. The disc preferably consists of stainless steel.

FIG. 4 shows in cross-section the complete pole lead-through traversing lid 2. The lower side of the synthetic plastic wall, together with rivet head 15 and the encircling sealing ring 19 (O-ring) forms the seal for the interior of the cell. Sealing ring 19 is pressed against the internal wall of the lid by the plate-shaped rivet head 15 of the pole bolt. The optimum compressive force is provided by a spacing ring 20 fixed to the wall. The shaft 14 of the pole bolt is positioned within an aperture in the synthetic plastic wall, in which concentric enlargements in both the upper and lower sides are provided. The enlarged aperture on the interior side is used to recess the rivet head. The enlarged aperture on the outer side receives the ring-shaped disc 17 required for the riveting. The upper portion of rivet 14 is riveted to the ring-shaped disc 17 positioned on the outside of lid 2. In so doing, the upper portion of the pole bolt shaft is spread and conformed to the conical aperture in ring-shaped disc 17. The connection is gas- and liquid-tight. Rubber is preferably used as the material for sealing ring 19, whereas the rivet is made of stainless steel or nickel-plated iron. Ring-shaped disc 17 serves as the external cell pole for current take-off.

FIG. 5 shows in cross-section a pole bolt whose shaft exterior consists of two cylindrical mantles of different outer diameters. The shaft portion 22 connected to plate-shaped rivet head 15 has a greater diameter than the shaft portion 23 which is positioned at the open end of the hollow cylinder. The shoulder 24 between the two cylinders defines a support, by means of which excessive compression of the O-ring during assembly is prevented.

In place of the riveted pole lead-through, it is also possible to use a threaded connection. Such a pole lead-through is disclosed by means of FIG. 6. The current take-offs of the electrodes are connected electrically and mechanically by means of bolt heads 25. The threaded shafts 26 surrounded by sealing ring 19 are led through an aperture in the housing lid and are held in place at the outside of the housing by plate-shaped nuts 27. These nuts simultaneously provide the contacts for current take-off. The lid aperture is—as already explained in relation to FIG. 5—provided with a spacing ring 20 on the inside of housing lid 2. The pressure exerted upon sealing ring 19 during screw tightening is determined by the height of this spacing ring.

We claim:

1. A gas-tight galvanic alkaline small battery cell having a synthetic plastic housing, and with sinter-foil electrodes, comprising:

electrodes and separators in the form of a plate package, a housing enclosing the plate package and formed of a bottom portion and a lid, the housing bottom having at least one housing post and and the plate package having apertures for receiving the housing post, the tip of the housing post being welded to the housing lid, and the housing lid having a pole lead-through for each polarity, said pole lead-through including a rivet having a plate-shaped rivet head, and an elastically deformable sealing ring pressed against the inside of the lid by the head.

2. The cell of claim 1 wherein the plate-shaped rivet head rests upon a spacing ring fixed to the lid and surrounding a shaft of the rivet, and the rivet shaft has a hollow in at least its upper portion and is riveted over the edge of a ring-shaped metal disc.

3. The galvanic cell of claim 2 wherein the rivet shaft includes two cylinders of different outer diameters, the cylinder with the smaller diameter forming the upper portion of the rivet shaft.

4. The cell of claim 2 wherein the rivet head and the ring-shaped disc are each positioned within a recess in the lid which is concentric with the aperture for the pole lead-through.

5. The cell of claim 1 wherein the housing post extends above the upper edge of the bottom portion, and is provided with a tapering tip.

6. The cell of claim 5 wherein the edges of the bottom portion and the tip of the housing post constitute the energy concentrators for welding.

* * * * *